United States Patent
Byler (10) Patent No.: US 9,755,682 B2
(45) Date of Patent: Sep. 5, 2017

(54) CASES HAVING SELECTABLE RF SHIELDING

(71) Applicant: C. A. Byler, Tempe, AZ (US)

(72) Inventor: C. A. Byler, Tempe, AZ (US)

(*) Notice: Subject to any disclaimer, the term of this patent is extended or adjusted under 35 U.S.C. 154(b) by 30 days.

(21) Appl. No.: 14/959,350

(22) Filed: Dec. 4, 2015

(65) Prior Publication Data
US 2016/0212893 A1    Jul. 21, 2016

Related U.S. Application Data

(60) Provisional application No. 62/103,572, filed on Jan. 15, 2015.

(51) Int. Cl.
*H04B 1/38*   (2015.01)
*G06F 1/16*   (2006.01)
*H04B 1/3888*  (2015.01)

(52) U.S. Cl.
CPC ............ *H04B 1/38* (2013.01); *G06F 1/1626* (2013.01); *G06F 1/1656* (2013.01); *H04B 1/3888* (2013.01); *G06F 2200/1633* (2013.01)

(58) Field of Classification Search
CPC ....... H04B 1/38; G06F 1/1656; G06F 1/1626; G06F 2200/1633
See application file for complete search history.

(56) References Cited

U.S. PATENT DOCUMENTS

| | | | |
|---|---|---|---|
| 2013/0206844 A1* | 8/2013 | Chen | H04B 1/3888 235/492 |
| 2013/0277101 A1* | 10/2013 | Judy | H05K 9/0043 174/378 |
| 2014/0251368 A1* | 9/2014 | Lawson | A45C 11/00 132/287 |

* cited by examiner

*Primary Examiner* — Dimary Lopez Cruz
*Assistant Examiner* — Abhishek Rathod
(74) *Attorney, Agent, or Firm* — Morgan Law Offices, PLC (57) ABSTRACT

Device cases with selectable RF shielding are described. Some implementations can include a case for an electronic device. The case can include selectable radio frequency (RF) shielding, such as a Faraday cage. The shielding can be selectable via a mechanically activated switch (e.g., slidable or rotatable), or an electrically activated switch.

15 Claims, 8 Drawing Sheets

CASES HAVING SELECTABLE RF SHIELDING

RELATED APPLICATIONS

This application claims the benefit of U.S. Provisional Application No. 62/103,572, entitled "Case with Faraday Cage Switch", filed on Jan. 15, 2015, which is incorporated herein by reference in its entirety.

BACKGROUND

Radio frequency (RF) technology is used in transferring and communicating data to and from mobile devices. Concerns have been growing over the potential health risks posed by prolonged exposure to RF energy, such as microwave signals, over time. In addition, privacy and security concerns over unauthorized wireless access via RF signals to personal data stored on devices has increased significantly as more personal data is stored on wirelessly accessible devices. It appears this trend will continue to rise in the future.

Some cases for portable electronic devices are known in the art to shield the devices from various RF signals including microwaves. These cases may still allow RF signals to reach the device from the sides and or the back. Cases that may completely disable RF signals from reaching the mobile device and radio frequency identification (RFID) cards, may essentially act as a pouch and RF signals cannot be transmitted or received without removing the device from the pouch. Presently there appears to be no device case having a mechanical or electrical solution for selectably enabling and disabling RF signal access for the device while contained within the case.

Implementations of the disclosed subject matter were conceived in light of the above-mentioned problems and limitations, among other things.

SUMMARY

Some implementations can include a case having Faraday cage-type RF shielding with a user selectable mechanism to turn on or off the shielding offered by the Faraday cage-type shielding. Some implementations provide an easy way for the user to utilize an RF shielding device where the shielding can be enabled and disabled by sliding or rotating a member that allows RF signals to be blocked from reaching the device or to be permitted to reach the device when the user wishes to have the RF shielded device capable of transmitting and or receiving RF signals. A need may exist for users of electronic devices placed within RF shielding enclosures to be able to easily enable and disable the RF shielding properties of the shielding enclosure.

Some implementations may provide a method of enabling/disabling RF radiation to and from a case by utilizing a movable part that acts as a Faraday-cage switch. The case can contain electrically conductive material that provides a shield to prevent electromagnetic energy from entering or leaving the case in addition to non-conductive openings for radio frequencies to pass through. The case can include a moveable member (e.g., a slider or iris-type member) that can be made of a conductive material. In the example of a sliding moveable member, the slider can be formed with a generally rectangular body portion, from one side projects an elongated slider actuating arm piece. The slider can include one or more openings of a non-conductive material that allow RF to penetrate the case when open (e.g., aligned with opening in the body of the case) and block RF when closed (e.g., aligned with conductive portion of the body of the case).

In some implementations, a rotating moveable member, much like an iris of a camera, may be utilized for this purpose. The openings may contain an antenna to help increase or amplify an RF signal when the moveable member is in the open position. Additionally, a electrically switched shielding element may be used that includes electrically activated substrates that can be activated to either allow or block RF radiation much like LCD materials on windows that can make the windows either transparent or opaque.

Some implementations can include a case having a first portion and a second portion. At least one of the first portion and the second portion can include a fixed portion and a moveable portion. The moveable portion can be configured to be moved, relative to the fixed portion, between a first position and a second position. When in the first position, the moveable portion covers an opening in the fixed portion so as to substantially block radio frequency energy from passing through the opening. And when in the second position, the moveable portion can expose the opening to permit radio frequency energy to pass through the opening.

The first portion and the second portion include Faraday shielding material except for the opening, which does not include Faraday shielding material. The case can be configured to receive a portable electronic device within an interior space defined by the first portion and the second portion.

An interior of at least one of the first portion and the second portion includes at least one slot configured to hold at least one card readable by radio frequency energy. An antenna can be disposed near the opening and configured to pass a radio frequency signal from an exterior of the case to an electronic device within the case.

The Faraday shielding material can include one or more of a conductive mesh, a conductive paint, metal, carbon fiber, and conductive radio frequency (RF) shielding injection moldable plastic. The moveable portion can be configured to move in a substantially linear motion relative to the fixed portion. The moveable portion can be configured to move in a substantially rotational motion relative to the fixed portion.

The case can include one or more additional openings. One of the first portion and the second portion can include a substantially transparent section having Faraday shielding material.

DETAILED DESCRIPTION

A method of joining two or more conductive materials to form an enclosure or case for an electronic device can include providing one or more conductive and non-conductive materials and arranging the materials in such a way that provides characteristics similar to that of a Faraday cage as well as an easy means for a user to position elements of the enclosure in such a way as to allow RF radiation to pass through the enclosure when these materials are positioned in another configuration.

Figure 1A:
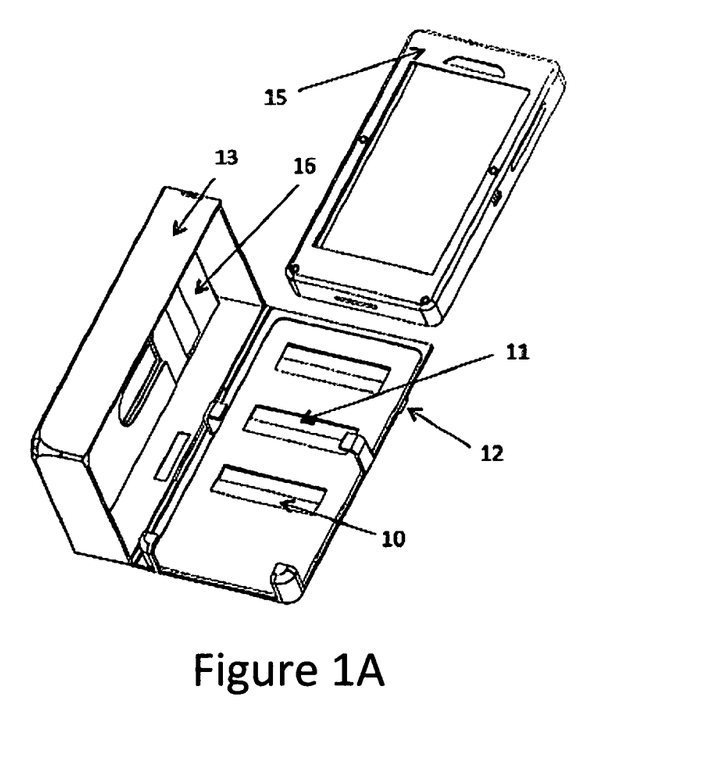
FIG. 1A is a diagram of an example case containing a mobile phone holder in addition to card slots for RFID cards and other wallet type items in accordance with some implementations.

FIG. 1A is a diagram of an example case containing a mobile phone holder in addition to card slots for RFID cards and other wallet type items. The case includes conductive Faraday cage material 13, such as a conductive mesh, paint, metal, carbon fiber, conductive RF shielding injection moldable plastic or other suitable type of Faraday or conductive material. The back of the case contains openings 11 that permit RF signals to pass through. The openings 11 can be formed from nonconductive materials that will allow RF signals to pass through. Openings for input/output needs such as power connector and camera lens contain a sliding conductive material that enables RF shielding when closed. A slidable wafer 10 enclosed within the case contains conductive Faraday cage material and has openings that align with the non conductive openings on the case when the wafer slider is in the open position allowing RF to pass and conductive material that closes the openings and enables the Faraday cage in the closed position. An elongated actuating arm piece 12 projects from the rectangular wafer to enable both open and closed positions through a sliding motion. A typical cell phone case 15 fits into the wallet case containing card slots 16 for holding RFID cards and other wallet type items.

Figure 1B:
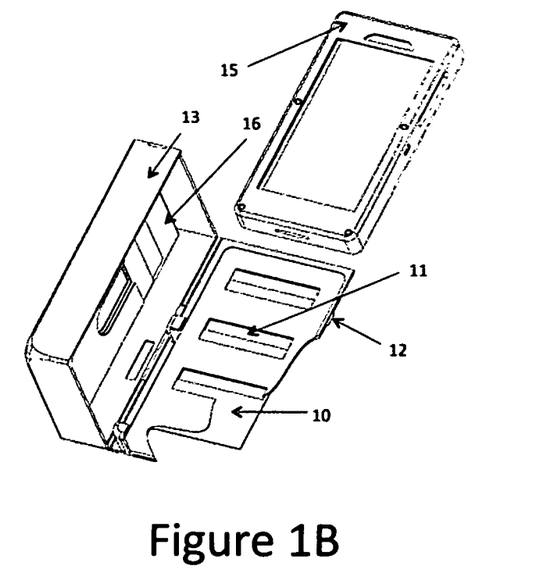
FIG. 1B is a diagram of a cross section of an example case having a slideable RF shield in accordance with some implementations.

FIG. 1B is a diagram of a cross section of the case shown in FIG. 1A showing a slidable wafer RF shield that is multi-positional and contains electrically conductive material 10 with a generally rectangular body portion and an elongated slider actuating arm piece 12 projecting from one side. The slidable wafer contains openings of a non-conductive material that allow RF to penetrate the case when open 11. The wafer openings may contain an antenna to increase the RF signal when aligned with the case openings. When the wafer is slid into the closed position, RF is shielded and the Faraday cage is enabled.

Figure 2A:
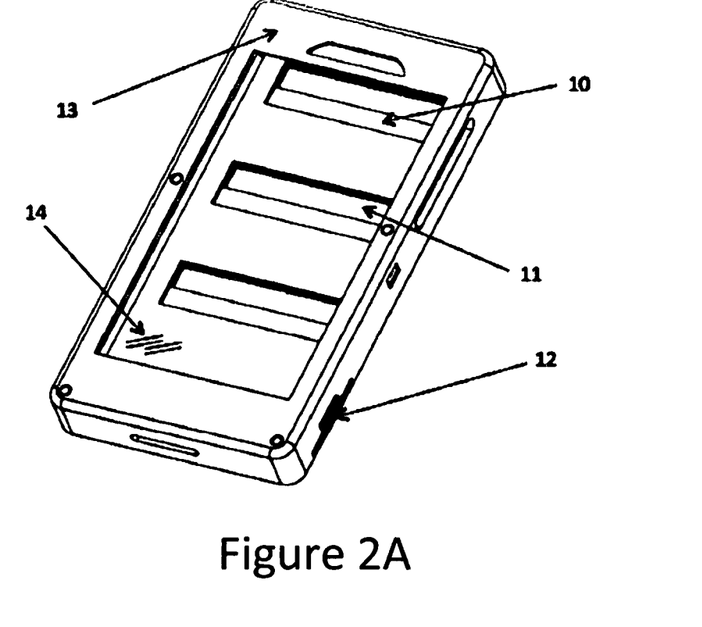
FIG. 2A is a diagram of an example case containing a mobile phone in accordance with some implementations.

FIG. 2A is a diagram of an example case containing a mobile phone, the case includes conductive Faraday cage material 13, the conductive material lining the case contains a conductive mesh, paint, metal, carbon fiber, conductive RF shielding injection moldable plastic or other suitable type of Faraday or conductive material. The display part of the case contains a transparent conductive material in the front to allow interaction with the device while within the case 14, this transparent material may consist of silver nanoparticles or other transparent conductive material to allow for use. The back of the case contains openings or non Faraday cage material that will allow RF waves to pass 11. A slidable wafer 10 enclosed within the case contains conductive Faraday cage material and has openings that align with the openings on the case when the wafer slider is in the open position allowing RF to pass and conductive material that closes the openings and enables the Faraday cage in the closed position. An elongated actuating arm piece 12 projects from the rectangular wafer to enable both open and closed positions through a sliding motion.

Figure 2B:
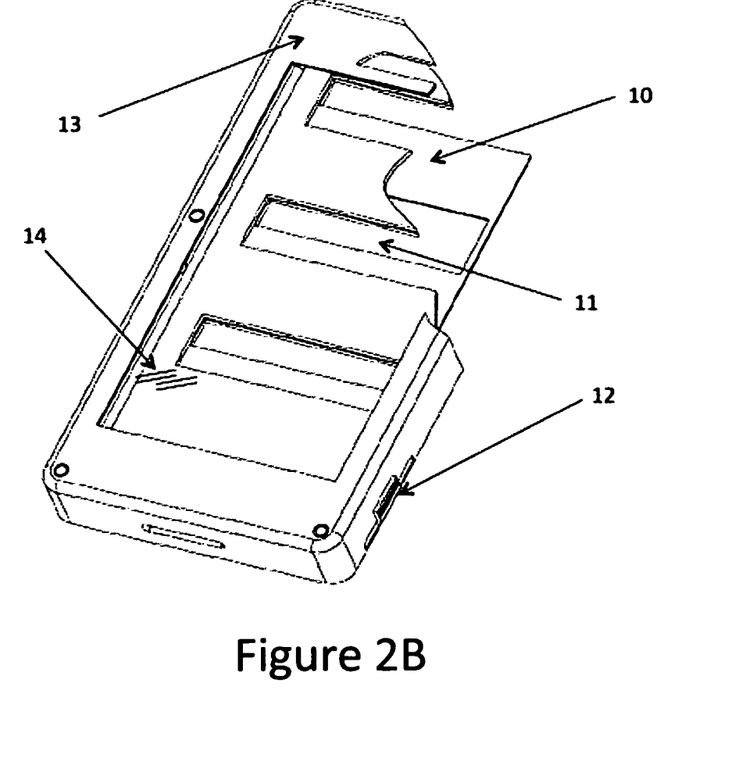
FIG. 2B is a diagram of a cross section of an example mobile phone case having a slideable RF shield in accordance with some implementations.

FIG. 2B is a diagram showing a cross section of the case shown in FIG. 2A with a slidable wafer RF shield that is multi-positional and contains electrically conductive material 10 with a generally rectangular body portion, from one side projects an elongated slider actuating arm piece 12. The slidable wafer contains openings of a non-conductive material that allow RF to penetrate the case when open 11. The wafer openings may contain an antenna to increase the RF signal when aligned with the case openings. When the wafer is slid into the closed position, RF is shielded and the Faraday cage is enabled.

Figure 3:
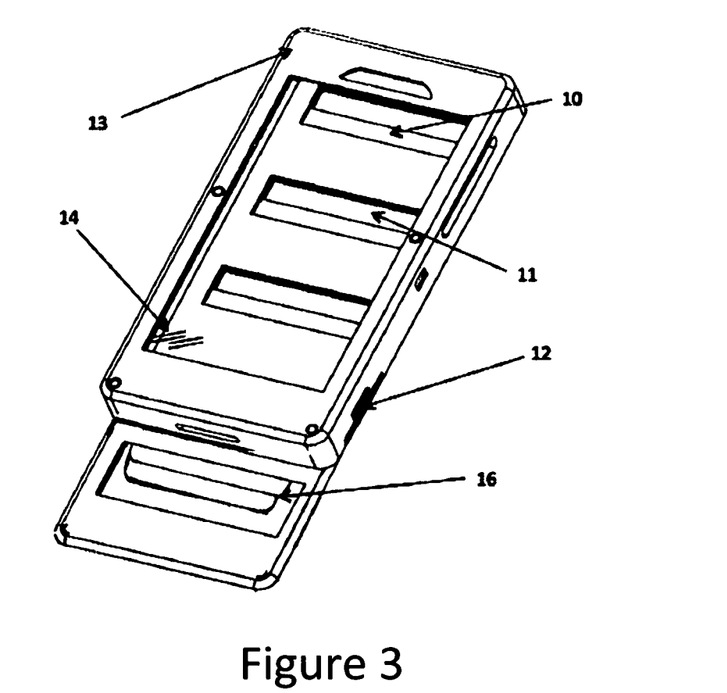
FIG. 3 is a diagram of an example case containing a mobile phone and card slots for RFID and other wallet type items in back portion of the case in accordance with some implementations.

FIG. 3 is a diagram of an example case containing a mobile phone, the case containing conductive Faraday cage material 13, the conductive material lining the case contains a conductive mesh, paint, metal, carbon fiber, conductive RF shielding injection moldable plastic or nearly any other type of Faraday or conductive material. The display part of the case contains a transparent conductive material in the front to allow interaction with the device while within the case 14, this transparent material may consist of silver nanoparticles or other transparent conductive material to allow for use. The back of the case contains openings or non Faraday cage material that will allow RF waves to pass 11. A slidable wafer enclosed within the case contains conductive Faraday cage material and has openings that align with the openings on the case when the wafer slider is in the open position allowing RF to pass and conductive material that closes the openings and enables the Faraday cage in the closed position 10. An elongated actuating arm piece 12 projects from the rectangular wafer to enable both open and closed positions through a sliding motion. A container 16 for holding RFID cards and other wallet type items is positioned in back part of the case between the phone and sliding wafer and accessed through sliding a compartment vertically or horizontally.

Figure 4:
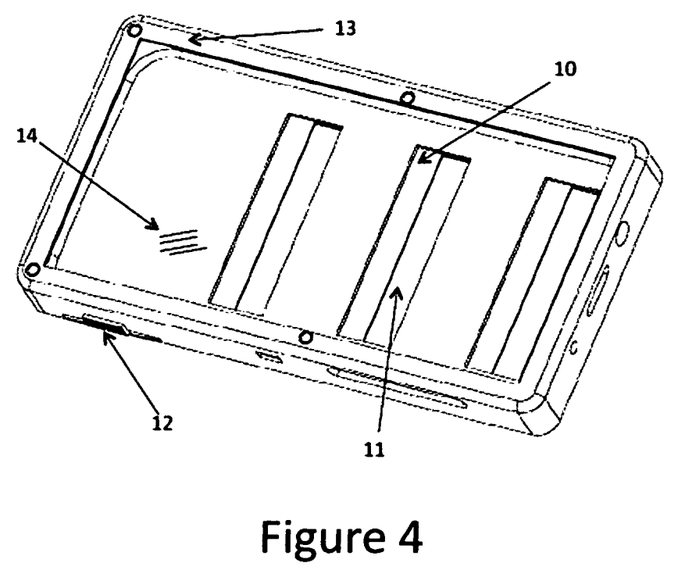
FIG. 4 is a diagram of an example case configured for use with a tablet or similar electronic device in accordance with some implementations.

FIG. 4 illustrates the present invention on a case containing a tablet, the case containing conductive Faraday cage material 13, the conductive material lining the case contains a conductive mesh, paint, metal, carbon fiber, conductive RF shielding injection moldable plastic or nearly any other type of Faraday or conductive material. The display part of the case contains a transparent conductive material in the front to allow interaction with the device while within the case 14, this transparent material may consist of silver nanoparticles or other transparent conductive material to allow for use. The back of the case contains openings or non Faraday cage material that will allow RF waves to pass 11. A slidable wafer enclosed within the case contains conductive Faraday cage material and has openings that synch with the openings on the case when the wafer slider is in the open position allowing RF to pass and conductive material that closes the openings and enables the Faraday cage in the closed position 10. An elongated actuating arm piece 12 projects from the rectangular wafer to enable both open and closed positions through a sliding motion.

Figure 5A:
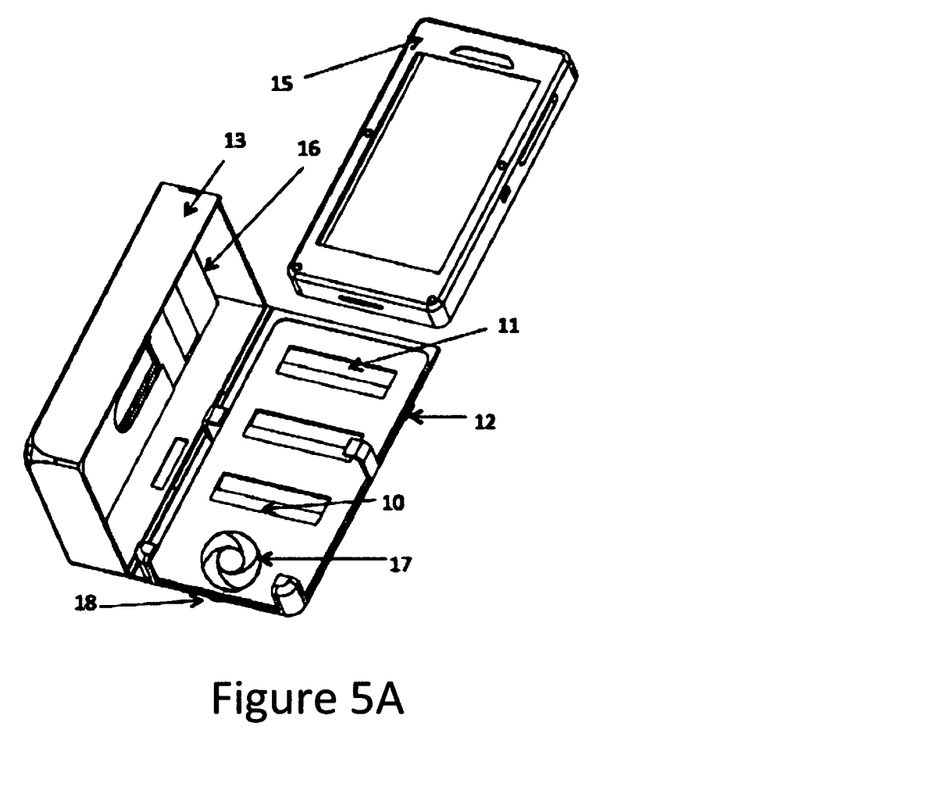
FIGS. 5A and 5B are diagrams of an example case configured to hold a mobile phone holder in addition to card slots for RFID cards and other wallet type items with multiple switches, one including a rotating means of allowing RF energy to penetrate and escape the case in accordance with some implementations.
Figure 5B:
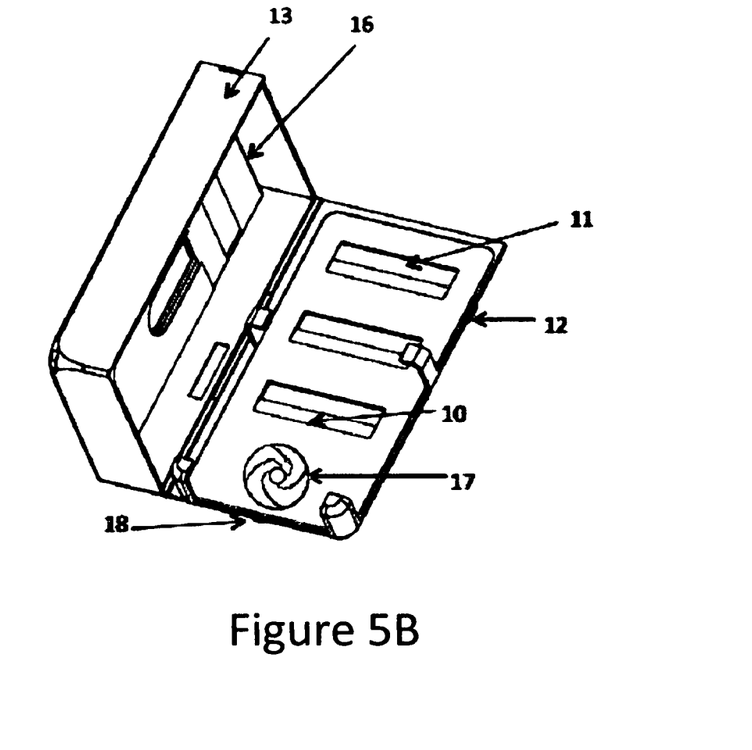

In FIGS. 5A and 5B, the wafer slides vertically and a rotating mechanism permits RF signals to penetrate and escape the case with a horizontal sliding actuating arm. The rotating component 17 has at least one matched pair of vanes containing Faraday cage material which are actuated by a rotating plate to modify size of the orifice and regulate flow of RF. An elongated actuating arm piece 18 projects from the rotating component to enable both open and closed positions through a horizontal sliding motion.

In another embodiment, the wafer or rotating component could slide vertically, horizontally or a combination of horizontal and vertical slides with one to many windows depending on the configuration of the RF chips on the device and whether one or multiple chips have RF signaling enabled/disabled.

In addition to the implementations described above detailing cases for mobile phones and containers holding RFID cards, another implementation includes a case containing a Faraday cage switch for any RF transmitting or receiving device such as, but not limited to, tablets (FIG. 4), laptops, cellular phones (e.g., smart phones, flip phones, etc.), Wi-Fi routers, gaming consoles, smart meters, smart home devices, vehicular communication devices, smart watches, fitness bands, wearable computers (e.g., Google Glass, etc.) and wireless dongles/adapters. As used herein, "device" or "electronic device" can include any device or apparatus that can receive, transmit, react to or respond to a radio frequency signal.

It is, therefore, apparent that there is provided, in accordance with the various embodiments disclosed herein, device cases having selectable RF shielding.

While the disclosed subject matter has been described in conjunction with a number of embodiments, it is evident that many alternatives, modifications and variations would be, or are, apparent to those of ordinary skill in the applicable arts. Accordingly, Applicant intends to embrace all such alternatives, modifications, equivalents and variations that are within the spirit and scope of the disclosed subject matter.

What is claimed is:

1. A case comprising:
a first portion; and
a second portion,
wherein at least one of the first portion and the second portion includes a fixed portion and a moveable portion, the moveable portion configured to be moved, relative to the fixed portion, between a first position and a second position, when in the first position, the moveable portion covering one or more openings in the fixed portion so as to substantially block radio frequency energy from passing through the one or more openings, and when in the second position the moveable portion aligning one or more openings in the moveable portion with the corresponding one or more openings in the fixed portion to permit radio frequency energy to pass through the one or more aligned openings, and
wherein the first portion and the second portion include Faraday shielding material except for the opening, which does not include Faraday shielding material.

2. The case of claim 1, wherein the case is configured to enclose an electronic device within an interior space defined by the first portion and the second portion.

3. The case of claim 1, wherein an interior of at least one of the first portion and the second portion includes at least one slot configured to hold at least one card readable by radio frequency energy.

4. The case of claim 1, wherein the Faraday shielding material includes one or more of a conductive mesh, a conductive paint, metal, carbon fiber, and conductive radio frequency (RF) shielding injection moldable plastic.

5. The case of claim 1, wherein the moveable portion is configured to move in a substantially linear motion relative to the fixed portion.

6. The case of claim 1, wherein the moveable portion is configured to move in a substantially rotational motion relative to the fixed portion.

7. The case of claim 1, wherein one of the first portion and the second portion includes a substantially transparent section having Faraday shielding material.

8. A case comprising:
a fixed portion and a moveable portion, the moveable portion configured to be moved, relative to the fixed portion, between a first position and a second position, when in the first position, the moveable portion covering one or more openings in the fixed portion so as to substantially block radio frequency energy from passing through the one or more openings, and when in the second position the moveable portion aligning one or more openings in the moveable portion with the one or more openings in the fixed portion to permit radio frequency energy to pass through the one or more aligned openings, and
wherein the fixed portion and the moveable portion include Faraday shielding material except for the opening, which does not include Faraday shielding material.

9. The case of claim 8, wherein the case is configured to enclose an electronic device within an interior space of the case.

10. The case of claim 8, wherein an interior of the case includes at least one slot configured to hold at least one card readable by radio frequency energy.

11. The case of claim 8, wherein the Faraday shielding material includes one or more of a conductive mesh, a conductive paint, metal, carbon fiber, and conductive radio frequency (RF) shielding injection moldable plastic.

12. The case of claim 8, wherein the moveable portion is configured to move in a substantially linear motion relative to the fixed portion.

13. The case of claim 8, wherein the moveable portion is configured to move in a substantially rotational motion relative to the fixed portion.

14. The case of claim 8, further comprising a substantially transparent section having Faraday shielding material.

15. A case comprising:
a first portion; and
a second portion,
wherein at least one of the first portion and the second portion includes a fixed portion and a moveable portion, the moveable portion configured to be moved, relative to the fixed portion, between a first position and a second position, when in the first position, the moveable portion covering a plurality of openings in the fixed portion so as to substantially block radio frequency energy from passing through the openings, and when in the second position the moveable portion aligning openings in the moveable portion with the corresponding openings in the fixed portion to permit radio frequency energy to pass through the aligned openings, and
wherein the first portion and the second portion include Faraday shielding material except for the opening, which does not include Faraday shielding material.

* * * * *